US012583709B2

(12) United States Patent
Munoz Sotoca

(10) Patent No.: US 12,583,709 B2
(45) Date of Patent: Mar. 24, 2026

(54) TAG DETECTION IN ELEVATOR SYSTEMS

(71) Applicant: Otis Elevator Company, Farmington, CT (US)

(72) Inventor: Javier Munoz Sotoca, Rivas-Vaciamadrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 1157 days.

(21) Appl. No.: 17/533,974

(22) Filed: Nov. 23, 2021

(65) Prior Publication Data

US 2022/0234864 A1 Jul. 28, 2022

(30) Foreign Application Priority Data

Jan. 28, 2021 (EP) .................................... 21382063

(51) Int. Cl.

*B66B 1/28* (2006.01)
*B66B 1/34* (2006.01)
*B66B 5/00* (2006.01)
*B66B 13/14* (2006.01)

(52) U.S. Cl.

CPC .............. *B66B 1/28* (2013.01); *B66B 1/3461* (2013.01); *B66B 5/0012* (2013.01); *B66B 13/146* (2013.01)

(58) Field of Classification Search

CPC ....... B66B 13/146; B66B 5/0012; B66B 1/28; B66B 1/3461; B66B 5/00; B66B 2201/4676

See application file for complete search history.

(56) References Cited

U.S. PATENT DOCUMENTS

| | | | | |
|---|---|---|---|---|
| 6,707,374 B1 * | 3/2004 | Zaharia | B66B 1/468 | |
| | | | 340/5.31 | |
| 8,857,569 B2 * | 10/2014 | Friedli | B66B 5/0012 | |
| | | | 187/392 | |
| 9,311,586 B2 * | 4/2016 | Robinette | G08B 21/0219 | |
| 9,725,279 B2 * | 8/2017 | Armistead | B66B 5/0037 | |
| 2012/0147798 A1 * | 6/2012 | Miller, II | H04Q 9/00 | |
| | | | 370/310 | |

(Continued)

FOREIGN PATENT DOCUMENTS

| | | |
|---|---|---|
| CN | 101618828 A | 1/2010 |
| CN | 202296627 U | 7/2012 |

(Continued)

OTHER PUBLICATIONS

European Search Report for application EP 21382063, dated Jul. 9, 2021, 69 pages.

*Primary Examiner* — Rina I Duda

(74) *Attorney, Agent, or Firm* — CANTOR COLBURN LLP

(57) ABSTRACT

An elevator system (2, 102) includes an elevator car (4, 104), a tag detection device (16, 116) arranged to detect the presence of tags (18, 20; 118, 120) in the elevator car (4, 104) and a control system (13). The control system (13) is arranged to determine if the tag detection device (16, 116) detects at least one of a set of associated tags (18, 20; 118, 120) 10 present in the elevator car (4, 104) and, if at least one of the set of associated tags (18, 20; 118, 120) is detected in the elevator car (4, 104), to prevent at least one travel operation of the elevator car (4, 104) until all or none of the set of associated tags (18, 20; 118, 120) is detected to be present in the elevator car (4, 104).

10 Claims, 4 Drawing Sheets

(56) References Cited

U.S. PATENT DOCUMENTS

| | | | | |
|---|---|---|---|---|
| 2014/0231185 | A1* | 8/2014 | Salmikuukka | B66B 1/2458 187/384 |
| 2018/0322268 | A1* | 11/2018 | Grammer | G07C 9/27 |
| 2018/0346283 | A1* | 12/2018 | Scoville | B66B 5/0012 |
| 2019/0172284 | A1* | 6/2019 | Herget | B25J 5/007 |
| 2020/0024103 | A1 | 1/2020 | Amuduri et al. | |

FOREIGN PATENT DOCUMENTS

| | | | |
|---|---|---|---|
| CN | 204802805 | U | 11/2015 |
| EP | 2704106 | A1 | 3/2014 |
| JP | 2006182556 | A | 7/2006 |
| WO | 2006017881 | A2 | 2/2006 |
| WO | 2006017881 | A3 | 2/2006 |

* cited by examiner

TAG DETECTION IN ELEVATOR SYSTEMS

FOREIGN PRIORITY

This application claims priority to European Patent Application No. 21382063.2, filed Jan. 28, 2021, and all the benefits accruing therefrom under 35 U.S.C. § 119, the contents of which in its entirety are herein incorporated by reference.

TECHNICAL FIELD

The present disclosure relates to elevator systems and methods for operating elevator systems.

BACKGROUND

Users of elevator systems often travel in groups and/or with personal possessions or pets. It is often desirable for these users not to become separated from their fellow travellers or possessions. For instance, a passenger may travel with a small child, a dog, or with one or more pieces of luggage.

When using elevator systems, users often have to pass through doorways (e.g. on entering or exiting an elevator car). This introduces a risk that a closing door separates the user and their co-passenger(s) or possession(s). Although elevator systems normally include obstruction detection devices that can prevent the door from closing if a user or item is physically obstructing the door, these cannot prevent the separation of associated entities located on either side of the door. Furthermore, even if two entities are joined by something that does pass through the doorway, this may be too small to be detected by the obstruction detection system. For instance, a slender dog leash may pass through a doorway, connecting a dog on one side to its owner on the other. In such a situation, if the obstruction detection system does not detect the leash, the door may close around the leash, separating the dog from its owner and possibly even trapping the leash, potentially causing distress or harm to the dog and/or the owner. It would be desirable to address one or more of these problems.

SUMMARY

According to a first aspect of the present disclosure there is provided an elevator system comprising: an elevator car; a tag detection device arranged to detect the presence of tags in the elevator car; and a control system arranged: to determine if the tag detection device detects at least one of a set of associated tags to be present in the elevator car; and if at least one of the set of associated tags is detected in the elevator car, to prevent at least one travel operation of the elevator car until all or none of the set of associated tags is detected to be present in the elevator car.

According to a second aspect of the present disclosure there is provided a method of operating an elevator system comprising an elevator car, the method comprising: detecting in the elevator car at least one of a set of associated tags; preventing at least one travel operation of the elevator car until all or none of the set of associated tags is detected in the elevator car.

Thus, if any of the set of associated tags is detected as being present in the elevator car, the at least one travel operation only proceeds once all of the other tags of the set of associated tags are also in the elevator car or once all of the tags have left the elevator car. In other words, at least one travel operation is prevented if an incomplete set of associated tags is detected in the elevator car. This may help to ensure that the set of associated tags always travel together and are not separated during a journey.

The set of associated tags is intended to mean a set of tags that are intended to travel together. For instance, tags of the set of associated tags may be carried by or otherwise attached to respective members of a group of passengers travelling together, a pet and its owner, a passenger and one or more items of luggage, or several objects that are to be transported together such as parcels that form part of a single consignment, or pieces of equipment that must always travel together (e.g. in a hospital). The tags may be portable. The tags may even be formed integrally with an entity (e.g. as part of parcel packaging).

In some examples, the set of associated tags may be attached to entities that are physically connected (e.g. a dog and its owner connected via a dog leash). In such examples, ensuring that the tags travel together is particularly beneficial because harm or damage could occur to the entities (and/or the elevator car) if they were to begin to travel separately. For instance, a dog leash could become trapped by a closing elevator car door and/or landing door.

Each tag may comprise an identifier that enables the set of associated tags to be identified. In some examples, each of the set of associated tags comprises the same identifier. The association of the tags may then be determined by the tag detection device and/or the control system consulting a reference device (such as a database) which may list the number of associated tags in the set for a given identifier. In some examples, each of the set of associated tags comprises a unique identifier. For instance, each tag may comprise a unique identifier in the form of a unique ID code.

The association of the tags may be determinable from the tags themselves. For instance, each of the associated tags may comprise information identifying the other tag(s) to which it is associated (e.g. information stored on an integrated computer memory). In one example, each of the tags comprises a unique identifier (e.g. a unique ID code) and a list of unique identifiers corresponding to the other tags of the set of associated tags. Additionally or alternatively, each tag of the set of associated tags may comprise a common feature (e.g. a common physical characteristic, or a common identifier such as an ID code) along with information identifying the total number of tags in the set of associated tags (i.e. the number of tags comprising the same common feature). In such examples, the tag detection device may be arranged to retrieve, from each detected tag, information identifying the other tags of the set of associated tags (e.g. the unique identifiers of associated tags, or a number of associated similar tags).

Additionally or alternatively, the association of the tags may be determinable from a reference device (such as a database) comprising information identifying the set of associated tags. In such examples, the tag detection device and/or the control system may consult the reference device to determine when all of the set of associated tags are present in the elevator car. For instance, information identifying the tags of the set of associated tags may be stored in a computer memory accessible by the tag detection device and/or the control system. The computer memory may form part of the detection device and/or the control system. Additionally or alternatively this information may be stored elsewhere, such as on a separate control device or on a remote server.

In some examples, each of the tags comprises a unique identifier (e.g. a unique ID code) and the reference device comprises a list of unique identifiers corresponding to the other tags of the set of associated tags. Additionally or alternatively, each tag of the set of associated tags may comprise a common feature (e.g. a common physical characteristic, or a common identifier such as an ID code) and the reference device comprises information identifying the total number of tags in the set of associated tags (i.e. the number of tags comprising the same common feature).

The use of a reference device to associate the tags may facilitate changes to the set of associate tags. For instance, new tags may be added or old tags removed from the set simply by updating the information held by the reference device (rather than having to update or re-issue every tag of the set).

The present disclosure may be implemented using many different types of tags and different tag technologies, including ultrasonic tags that transmit ultrasonic signals that can be detected by one or more microphones; optical tags comprising optically-identifiable features that can be detected by one or more cameras; or radio-frequency tags (e.g. RFID tags) that can be detected using one or more radio-frequency devices. Examples of optically-identifiable features include physical attributes such as size, shape or colour, alphanumeric characters or machine-readable codes such as QR codes. A set of associated tags may comprise a mixture of different types of tags.

A particular tag may comprise two or more types of tag technology (e.g. an RFID tag having a casing with optical features), allowing the tag to be detected by different types of tag detection devices. In some examples the elevator system comprises multiple different tag detection devices operable to detect tags of different types to provide redundancy and reduce detection errors. Of course, using tags comprising two or more types of tag technology may additionally or alternatively allow the same tags to be used in different elevator systems that have different tag detection devices.

In a preferred set of examples, the set of associated tags comprises radio-frequency identification (RFID) tags. Each tag of the set may store a unique identifier such as a unique ID code, which is readable by the tag detection device. The tags may be passive RFID tags. One or more of the set of associated tags may comprise part of another device (e.g. a smartphone or a smart-watch).

In examples featuring RFID tags, the tag detection device may comprise an RFID detection device comprising at least one antenna. The antenna may be mounted to, housed in or comprised by at least a portion of the elevator car. In one example, the RFID detection device comprises a transmission antenna and a reception antenna. The transmission antenna may be operable to transmit a signal to any RFID tags located in the elevator car, and the reception antenna may be operable to detect any signals produced by RFID tags located in the elevator car. The transmission and reception antennae may be comprised by respective opposing portions of the elevator car (e.g. mounted on or housed in opposing portions of the elevator car). This may facilitate good detection coverage of the elevator car without detection coverage extending substantially outside the elevator car (which could lead to false detections). For example, two opposing antennae may be comprised by opposing side walls of the elevator car. The antennae may have a size on the order of the size of the side walls of the elevator car. Of course, antenna(e) of the tag detection device may additionally or alternatively be mounted on, housed in or comprised by a separate apparatus positioned near or inside the elevator car.

The at least one travel operation may comprise any operation of the elevator car that relates to travel. For instance, the at least one travel operation may comprise one or more of: processing an elevator call, operating a door (e.g. an elevator car door and/or a landing door), or moving the elevator car (i.e. actual travel movement). Preventing only one travel operation may be sufficient to avoid separating the associated tags even if other travel operations are not directly prevented. For instance, preventing operation of the elevator car doors and/or landing doors may indirectly prevent any travel of the elevator car despite this not being directly prohibited in some examples (e.g. due to conventional elevator safety mechanisms that prevent movement of the elevator car whilst the doors are open).

In some examples, processing of an elevator call (e.g. input by a passenger in the elevator car or on a landing, or otherwise allocated e.g. based on passenger recognition) may be prevented until all or none of the set of associated tags are detected to be present in the elevator car. This not only indirectly prevents elevator travel whilst the tags are separated (as there is no elevator call for the elevator car to serve), but can also serve as a reminder to a passenger attempting to input an elevator call that one or more of the associated tags is not in the elevator car. Inputting of an elevator call may be prevented by simply ignoring call inputs, delaying call inputs (until their processing is no longer prevented) or by entirely disabling one or more elements of a call input interface (i.e. so that passenger call inputs cannot even be provided). The processing of an elevator call may include registering an elevator call with a controller configured to drive the elevator car.

Additionally or alternatively, in some examples, movement of the elevator car may be prevented until all or none of the set of associated tags is detected to be present in the elevator car. In other words, the elevator car may not move to serve any elevator calls (including calls issued elsewhere) until it is confident that doing so will not separate the tags of a set of associated tags.

In some sets of examples, additionally or alternatively, the at least one travel operation comprises closing a door operable to close a doorway between the elevator car and a landing. In other words, the elevator system may comprise a door operable to close a doorway between the elevator car and a landing, wherein the control system is arranged to prevent closing of the door until all or none of the set of associated tags is detected to be present in the elevator car. This may ensure that the associated tags are not separated by a closing or closed door. The door may comprise an elevator car door and/or a landing door. The door may comprise multiple door panels (e.g. two door panels that close from opposite sides of the doorway and/or a telescoping door made up of several telescoping door panels). The door may be located at the front or rear of the elevator car.

In some examples, the control system is arranged to trigger one or more actions if an incomplete set of associated tags is detected in the elevator car (i.e. in addition to preventing one or more travel operations). For instance, the control system may be arranged to reopen a partially or fully closed door, or to return an elevator car to a departure floor. In some examples the control system is arranged to issue an audible and/or visible alert at the elevator car. This may further reduce the chances of tag separation or at least the amount of time for which associated tags are separated.

The control system may check repeatedly if any tags of the set of associated tags are present in the elevator car, for instance throughout a period of time prior to a scheduled elevator car departure. In some sets of examples, the tag detection device may be activated to detect tags when a door closing process begins. The tag detection device may be switched off to save power once the elevator doors have completely closed, or once the elevator car has departed. Alternatively, the tag detection device may operate substantially continuously throughout elevator car operation, e.g. in case an obscured or faulty tag of an associated set is only detected once an elevator car has departed.

The control system may include an elevator controller (i.e. configured to drive the elevator car to respond to elevator calls). For instance the tag detection device may be connected to an elevator controller which in turn controls the at least one travel operation of the elevator car (e.g. via one or more other systems or sub-systems such as a door control system). Alternatively, the control system may comprise one or more sub-systems to which the tag detection device may be connected directly (e.g. a door control system that executes door operation or a call input controller operable to receive call inputs). In other words, the control system may operate to prevent one or more travel operations independently to a main elevator controller.

Features of any aspect or example described herein may, wherever appropriate, be applied to any other aspect or example described herein. Where reference is made to different examples, it should be understood that these are not necessarily distinct but may overlap.

DRAWING DESCRIPTION

One or more non-limiting examples will now be described, by way of example only, and with reference to the accompanying figures in which.

DETAILED DESCRIPTION

Figure 1:
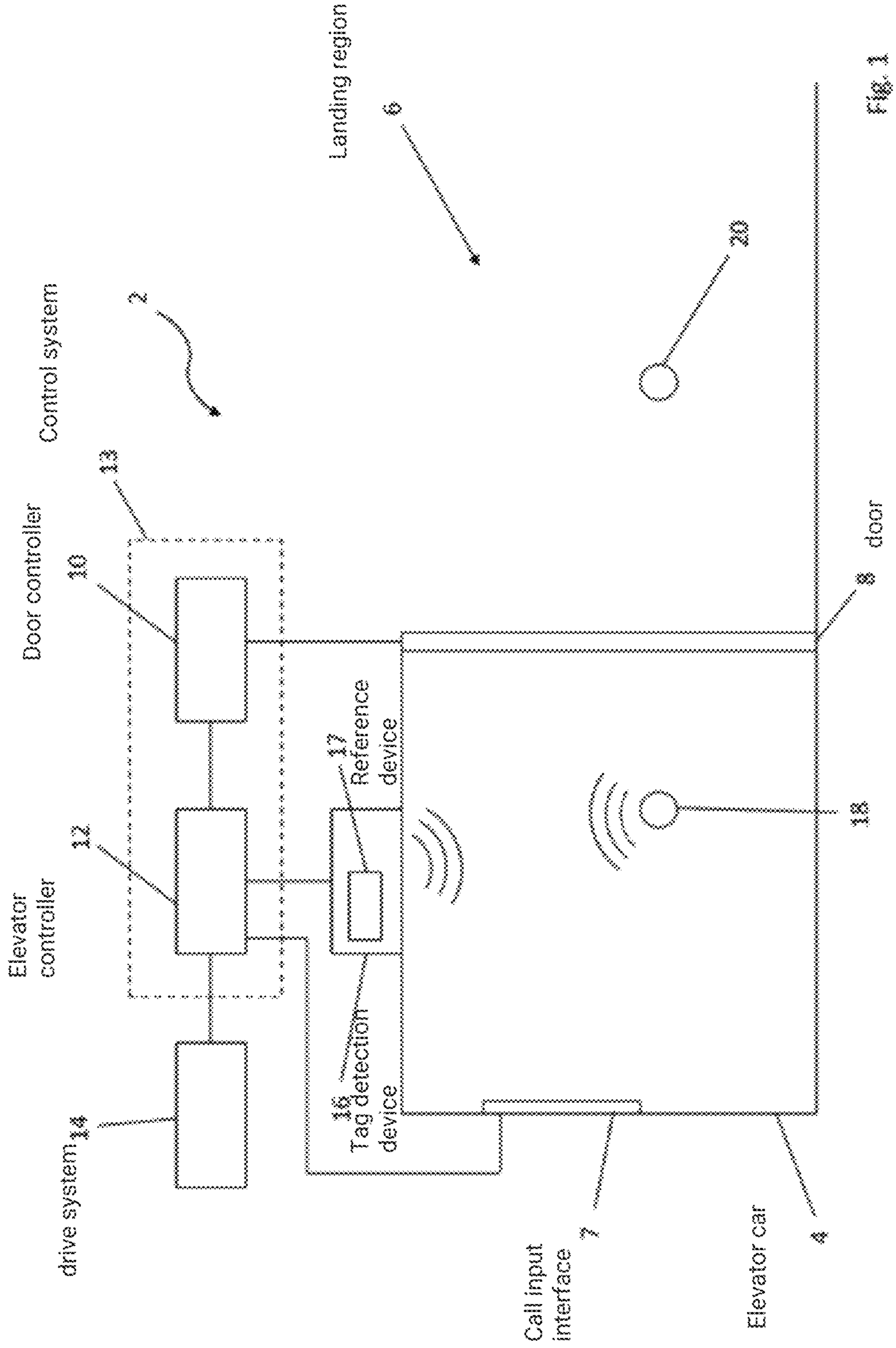
FIGS. 1 and 2 illustrate an elevator system according to an example of the present disclosure.

As shown in FIG. 1, an elevator system 2 comprises an elevator car 4 operable to transport passengers within a building (not shown). The elevator car 4 is shown adjacent a landing region 6, from which passengers can board the elevator car 4.

The elevator car 4 is accessed from the landing region 6 through a doorway that is closable by a door 8. The elevator car 4 comprises a call input interface 7 where passengers can input an elevator call. The operation of the door 8 (i.e. opening and closing) is controlled by a door controller 10. The door controller 10 itself receives commands from an elevator controller 12. The elevator controller 12 may, for instance, also provide commands to a drive system 14 that drives the elevator car 2 to move (e.g. in response to an elevator call input by a passenger via the call input interface 7). Together, the door controller 10 and the elevator controller 12 form a control system 13.

The elevator system 2 also comprises a tag detection device 16 that is arranged to detect the presence of tags such as a first tag 18 and a second tag 20 in the elevator car 4. The tag detection device 16 cannot detect tags outside of the elevator car 4 (i.e. its range of detection is effectively limited to the inside of the elevator car 4). The first tag 18 and the second tag 20 comprise unique identifying information (e.g. a stored unique ID number). The tag detection device 16 is operable to detect the unique identifying information of tags present in the elevator car 4.

The elevator controller 12 comprises a reference device 17 (e.g. a computer memory) which stores information that identifies the first 18 and second tag 20 as making up a set of associated tags. For instance, the reference device 17 may store a database of ID codes of associated tags. The reference device 17 may alternatively form part of the tag detection device 16 or any other suitable component including a remote server.

In some examples the tag detection device 16 may comprise an RFID transmitter/receiver pair and the tags 18, 20 comprise RFID tags, although other tag technologies may also be used (e.g. where the tag detection device 16 comprises a camera and the tags 18, 20 comprise optical labels such as printed alphanumeric characters, barcodes or QR codes).

Figure 2:
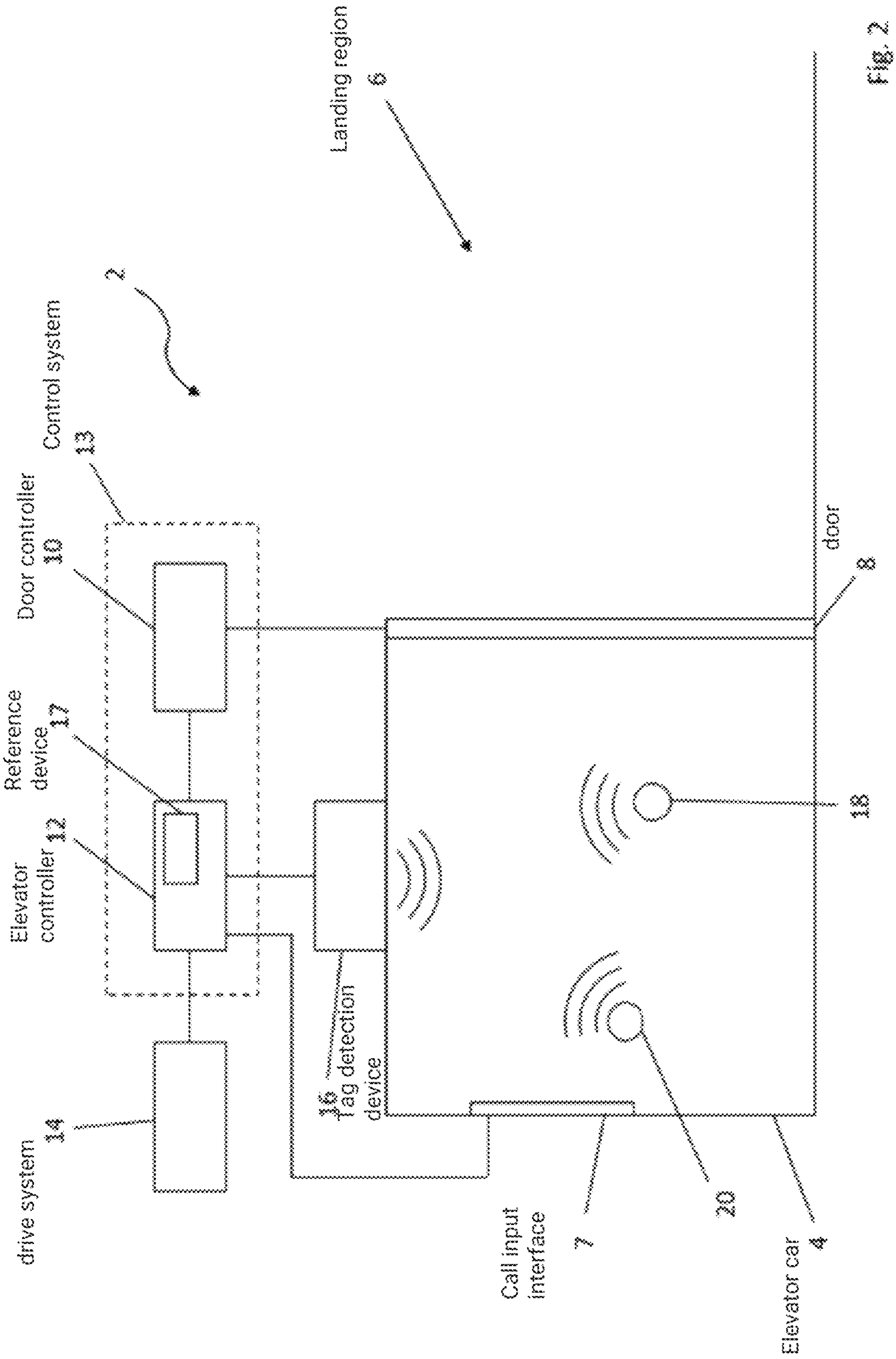

In the example illustrated in FIGS. 1 and 2, the first tag 18 is carried by or otherwise attached to a first entity (not shown) that intends to travel in the elevator car 4. For instance, the first tag 18 may be located in an item of clothing worn by an elevator passenger. The second tag 20 is carried by or otherwise attached to an entity associated with the passenger, such as a dog, a child or a piece of luggage. The first and second tags 18, 20 form a set of associated tags, as they are attached to entities that should not be separated. As mentioned above, the reference device 17 stores this association.

In the situation depicted in FIG. 1, the entity carrying the first tag 18 has entered the elevator car 4, but the entity carrying the second tag 20 has not. The tag detection device 16 thus detects the presence of only the first tag 18 and informs the elevator controller 12 accordingly. The elevator controller 16, using the information stored in the reference device 17, determines that the first tag 18 is one of a set of associated tags which also includes the second tag 20, and thus determines that an incomplete set of associated tags is present in the elevator car 4. To avoid separating the first and second tags 18, 20, the elevator controller 12 prevents at least one travel operation of the elevator car 4. For instance, the elevator controller 12 may prevent the door controller 10 from closing the door 8, disable the call input interface 7 to prevent elevator calls from being input, and/or prevent any movement of the elevator car 4 by the drive system 14. This ensures that the entities carrying the tags 18, 20 are not separated by the door 8 closing and/or the elevator car 4 departing from the landing 6.

At a later time, shown in FIG. 2, the entity carrying the second tag 20 has entered the elevator car 4. At this time, the tag detection device 16 detects the first tag 18 and the second tag 20 (because they are both in the elevator car 4), i.e. all of the set of associated tags. The tag detection device 16 informs the elevator controller 12 accordingly. The elevator controller 12 determines that all of the set of associated tags are present in the elevator 4 and stops preventing the at least one travel operation of the elevator car 4, allowing the two entities carrying the first and second tags 18, 20 to travel to their destination.

Of course, the elevator controller 12 also prevents at least one travel operation of the elevator car 4 if only the second tag 20 is detected in the elevator car 4, until both or neither of the first and second tags 18, 20 are present in the elevator car 4.

Figure 3:
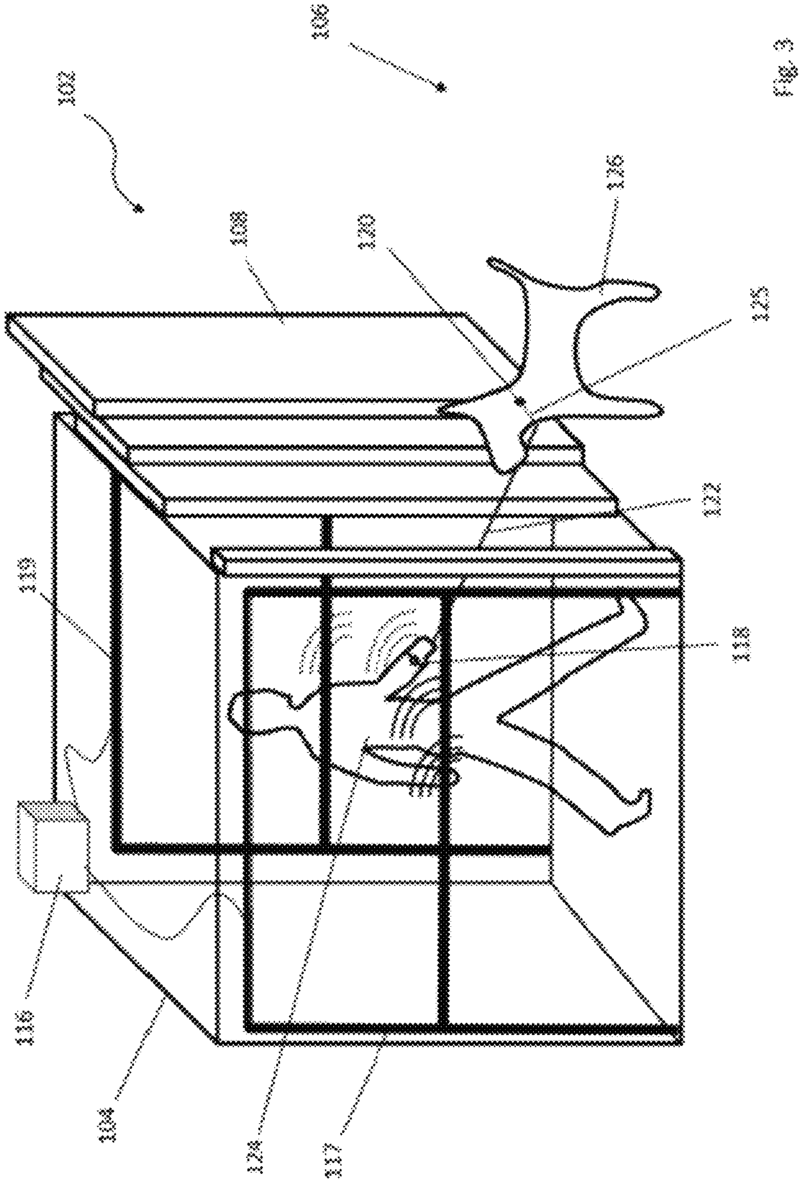
FIG. 3 illustrates an elevator system according to another example of the present disclosure.

FIG. 3 shows illustrates another example of the present disclosure. An elevator system 102 comprises an elevator car 104 operable to transport passengers within a building.

The elevator car 104 is shown adjacent a landing region 106, from which passengers can board the elevator car 104. The elevator car 104 is accessed from the landing region 106 through a doorway that is closable by a door 108 (e.g. an elevator car door coupled to a landing door). The operation of the door 108 (i.e. opening and closing) is controlled by a door controller (not shown).

The elevator system 102 also comprises a tag detection device 116 comprising an RF transmission antenna 117 and an RF reception antenna 119. The RF transmission and reception antennae 117, 119 are mounted on opposing side walls of the elevator car 104. This ensures that the tag detection device 116 has a range of detection that substantially matches the internal space of the elevator car 104 without extending significantly outside the elevator car 104.

FIG. 3 also shows a first tag 118 and a second tag 120. The first tag 118 is attached to the handle end of a dog leash 122, which is held by a passenger 124. The second tag 120 is attached to a collar 125 worn by a dog 126. The dog leash 122 is connected to the collar 125. The first and second tags 118, 120 are passive RFID tags which store unique ID codes.

The tag detection device 116 is operable to detect the presence and unique ID code of any RFID tag located in the elevator car 104. The tag detection device 116 transmits a radio signal from the RF transmission antenna 117 which is received by any RFID tag located in the elevator car 104. This radio signal induces an electric current in the RFID tag which in turn causes the RFID tag to produce a second radio signal that encodes its unique ID code. The second radio signal is received by the RF reception antenna 119.

The operation of the elevator system 102 will now be described with reference to FIG. 4.

In the situation illustrated in FIG. 3, the passenger 124 and the dog 126 are in the process of exiting the elevator car 104. The dog 126 (and thus the second tag 120) has already left the elevator car 104, but the passenger 124 (and the first tag 118) remains in the elevator car 104. Although the dog leash 122 passes through the doorway, its slim profile means that it is not detected by a conventional obstruction detector monitoring the doorway (not shown). In step 202, the door 108 begins to close in preparation for the elevator car 104 to travel to its next destination.

At step 204, the RF transmission antenna 117 transmits a radio signal in the elevator car 102. This is picked up by the first tag 118, which thus emits a second radio signal in which its unique ID code is encoded. In step 206 the RF reception antenna 119 detects the second radio signal and identifies the unique ID code of the first tag 118.

The tag detection device 116 relays this information to an elevator controller (not shown), which comprises a reference device (also not shown) containing a database of ID codes of associated tags. Using the information stored in the reference device, the elevator controller determines that the first tag 118 is part of a set of associated tags (with the second tag 120).

In step 208, the elevator system 102 checks if both of the first and second tags 118, 120 are detected (i.e. if all of the set of associated tags are in the elevator car 102). Because the second tag 120 has already left the elevator car 104, it is not detected by the tag detection device 116. Thus the elevator controller in step 210 prevents the door 108 from closing, to prevent the first and second tags 118, 120 from being separated by the closed door 108. Of course, if only the second tag 120 were detected by the tag detection device 116 in step 208 (e.g. if the passenger 124 leaves the elevator car 104 before the dog 126) the elevator controller would also prevent the door 108 from closing in step 210. In step 212 the elevator controller opens the door 108. After a short delay, the process returns to step 202 and begins to close the door 108 again.

Figure 4:
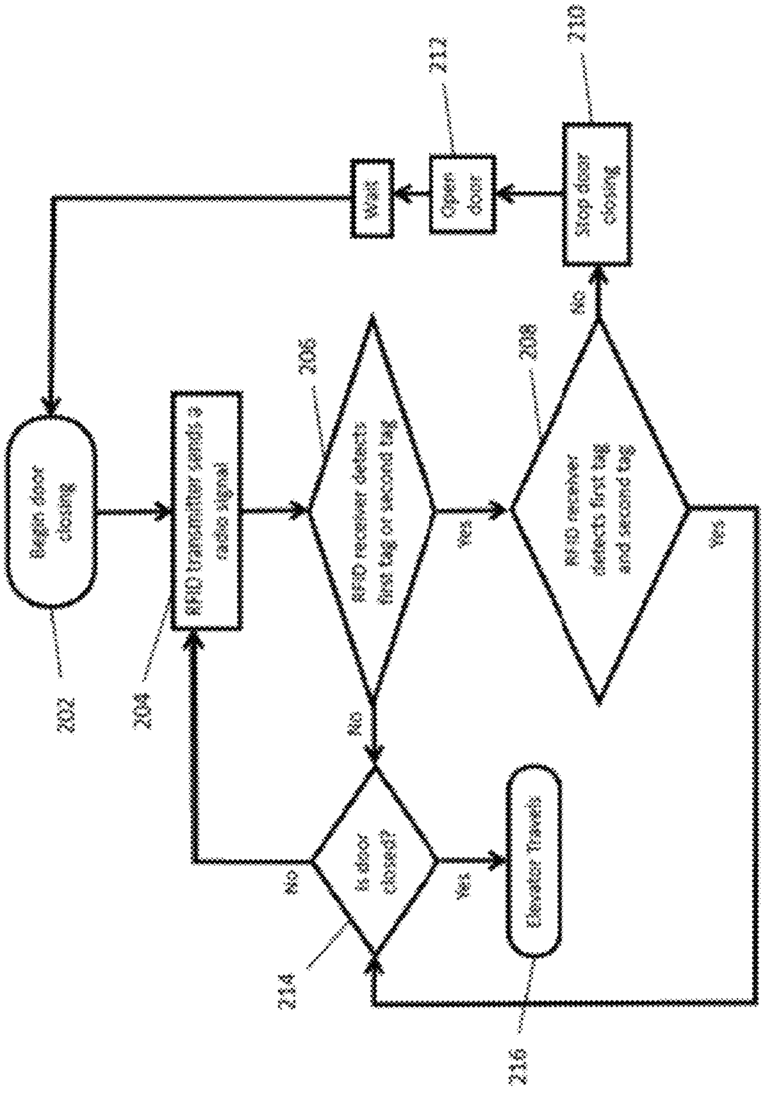
FIG. 4 is a flow diagram illustrating operation of the elevator system shown in FIG. 3.

At a subsequent time (e.g. after several repetitions of the process shown in FIG. 4, the passenger 124 leaves the elevator car 104. Thus at step 206 the first tag 118 is not detected in the elevator car 104 (i.e. none of the set of associated tags is detected to be present in the elevator car 104). Thus the door closing is not prevented. At step 214 the elevator system 102 checks whether the door 108 is closed. If it is still closing, the process returns to step 204 and continues to monitor for any tags in the elevator car (in case one or more tags re-enter the elevator). Once the door 108 finally closes the elevator car 104 can travel in step 216. Alternatively, the elevator car 104 can travel if both tags 118, 120 are detected in the elevator car in step 208 and the door is closed (step 214). Thus, travel operation of the elevator car 104 is prevented until none or all of the set of associated tags (i.e. the first and second tag 118, 120) is present in the elevator car 104. This means that the dog 126 and its owner 124 are not separated by the closed door 108, the leash 120 is not trapped in the closed door 108 and the elevator car 104 does not travel whilst the dog and its owner are separated.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, 10 but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. An elevator system (2, 102) comprising:

an elevator car (4, 104);

a tag detection device (16, 116) arranged to detect the presence of tags (18, 20; 118, 120) in the elevator car (4, 104); and a control system (13) arranged:

to determine if the tag detection device (16, 116) detects at least one of a set of associated tags (18, 20; 118, 120) present in the elevator car (4, 104); and if at least one of the set of associated tags (18, 20; 118, 120) is detected in the elevator car (4, 104), to prevent at least one travel operation of the elevator car (4, 104) until all or none of the set of associated tags (18, 20; 118, 120) is detected to be present in the elevator car (4, 104);

wherein each of the set of associated tags (18, 20; 118, 120) comprises a unique identifier and a list of unique identifiers corresponding to other tags in the set of associated tags (18, 20; 118, 120), and the association of the set of associated tags (18, 20; 118, 120) is determinable by each tag in the set of associated tags (18, 20; 118, 120).

2. The elevator system (2, 102) as claimed in claim 1, wherein information identifying the tags of the set of associated tags (18, 20; 118, 120) is stored in a computer memory (17) accessible by the tag detection device (16, 116) and/or the control system (13).

3. The elevator system (2, 102) as claimed in claim 1, wherein the set of associated tags (18, 20; 118, 120) comprises RFID tags.

4. The elevator system (2, 102) as claimed in claim 1, wherein the tag detection device (16, 116) comprises an RFID detection device comprising at least one antenna (117, 119).

5. The elevator system (2, 102) as claimed in claim 4, wherein the antenna (117, 119) is mounted to, housed in or comprised by at least a portion of the elevator car (4, 104).

6. The elevator system (2, 102) as claimed in claim 4, wherein the tag detection device (16, 116) comprises a transmission antenna (117) and a reception antenna (119) comprised by respective opposing portions of the elevator car (4, 104).

7. The elevator system (2, 102) as claimed in claim 1, wherein the at least one travel operation comprises one or more of: processing an elevator call, operating a door (8, 108), or moving the elevator car (4, 104).

8. The elevator system (2, 102) as claimed in claim 1, comprising a door (8, 108) operable to close a doorway between the elevator car (4, 104) and a landing (6,106), and wherein the control system (13) is arranged to prevent closing of the door (8, 108) until all or none of the set of associated tags (18, 20, 118, 120) is detected to be present in the elevator car (4, 104).

9. The elevator system (2, 102) as claimed in claim 1, arranged to switch off the tag detection device (6, 106) once the elevator doors (8, 108) have completely closed, or once the elevator car (4, 104) has departed.

10. A method of operating an elevator system (2, 102) comprising an elevator car (4, 104), the method comprising:

detecting in the elevator car (4, 104) at least one of a set of associated tags (18, 20, 118, 120);

preventing at least one travel operation of the elevator car (4, 104) until all or none of the set of associated tags (18, 20, 118, 120) is detected in the elevator car (4, 104);

wherein each of the set of associated tags (18, 20; 118, 120) comprises a unique identifier and a list of unique identifiers corresponding to other tags in the set of associated tags (18, 20; 118, 120), and the association of the set of associated tags (18, 20; 118, 120) is determinable from each tag in the set of associated tags (18, 20; 118, 120) by each tag itself.

* * * * *